March 11, 1930.  V. B. SOUNITZA  1,750,436

ELECTRIC ARC CUTTING APPARATUS

Original Filed Aug. 17, 1927

VLADIMIR B. SOUNITZA

INVENTOR

BY John P. Nikonov

ATTORNEY

Patented Mar. 11, 1930

1,750,436

UNITED STATES PATENT OFFICE

VLADIMIR B. SOUNITZA, OF PASADENA, CALIFORNIA

ELECTRIC-ARC CUTTING APPARATUS

Application filed August 17, 1927, Serial No. 213,533. Renewed January 23, 1930.

My invention relates to electric arc cutting apparatus and has a particular reference to apparatus adapted to produce an electric arc with a strongly oxidizing flame.

The action of an electric arc in cutting metals depends primarily on its high temperature, so that a portion of metal, subjected to the action of the arc, rapidly melts away.

The rapidity and effectiveness of the cutting action of the arc may be greatly increased, however, by rendering the flame of the arc strongly oxidizing. For this purpose I introduce a blast of oxygen in the arc in such a manner that it deflects the arc against the work and, together with the heat of the arc, tends to rapidly oxidize and destroy the material of the work at the point of application of the arc.

My invention is more fully described in the accompanying specification and drawing in which—

Figure 1:
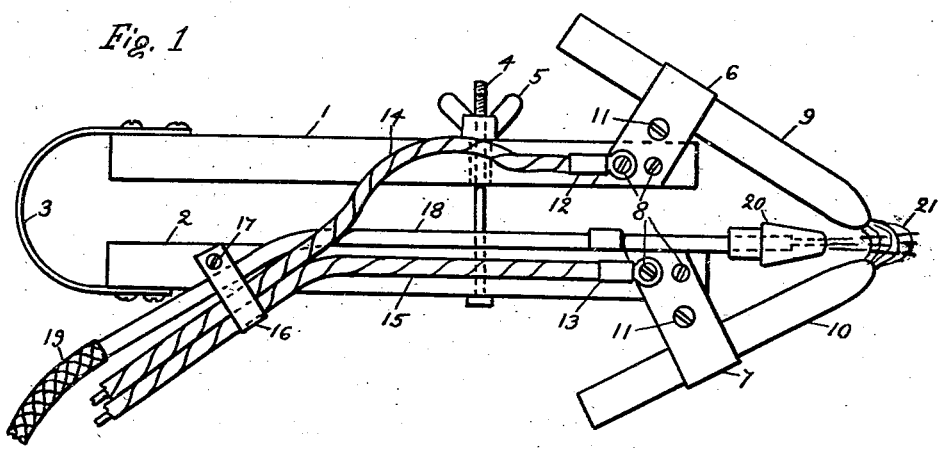
Figure 2:
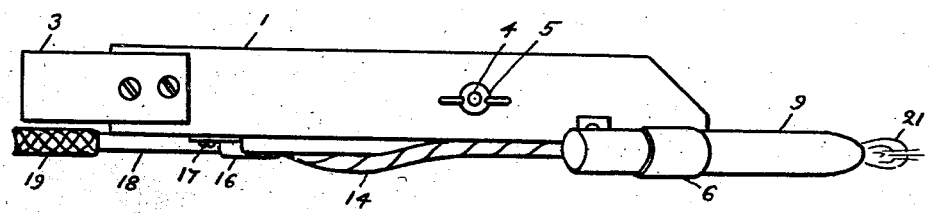

Fig. 1 is an elevation of my device, and Fig. 2 is a top view of same.

My apparatus consists of electrode holders or supporting bars 1 and 2 joined at the rear ends with a flat spring 3 which tends to keep them apart. They are held at a desired distance from each other by means of a screw 4 one end of which is attached to the bar 2 and the other passes freely through an aperture in the bar 1 and is provided with an adjusting wing nut 5.

The other ends of bars 1 and 2 support clips 6 and 7 attached with screws 8. These clips are provided with tubular outer portions in which arc electrodes 9 and 10 are slidably fitted. The clips are preferably made of thin resilient metal strips and the electrodes can be clamped tightly by means of screws 11 which are adapted to draw the sides of the clips together. Nuts (not shown) may be provided on the ends of the screws 11. The clips are placed at an angle as shown in order to bring the operating ends of the electrodes 9 and 10 together.

Terminals 12 and 13 are clamped under screws 8 for cables 14 and 15 which are used to connect the electrodes with a source of electric current (not shown). The cables are covered with a heat resisting insulation, which may be asbestos, glass beads etc.

The bars 1 and 2 are also made of a heat resisting insulating material, such as bakelite or similar compositions.

The cables are attached to the lower bar 2 by means of a clip 16 and a screw 17. The same clip also holds a pipe 18 for oxygen or similar gas of an oxidizing nature. A flexible rubber hose 19 is connected with the pipe 18.

The front end of the pipe 18 is provided with a nozzle 20 made of a refractory material, such as porcelain, lava, etc. This nozzle is slidably fitted on the end of the pipe and may be moved at a desired distance from the arc 21. It is placed so that a stream of oxygen can be directed in the middle of the arc from the rear.

The operation of my device is as follows:

The operator takes the electrode holders in his hand, adjusting the wing nut 5 so as to keep the electrodes at an approximately correct distance apart. The current is then turned on by means of a suitable switch (not shown), and the wing nut again adjusted for the correct length of arc. The oxygen is then admitted into the pipe 18 from a storage tank or bottle (not shown). The arc is drawn by closing the electrodes and releasing them again. This is accomplished by simply tightening the hand grip on the bars and releasing again. The electrodes are usually made of carbon and, since they are gradually consumed by the arc, the proper length of same can be maintained by tightening the screw 5 or, for short periods, by tightening the hand grip on the bar.

Important advantages of my device are that it is portable, only one hand is required for its operation, and it allows a convenient regulation of the length of the arc. The method of using an arc with a stream of oxygen has an advantage of providing a powerful oxidizing arc flame for cutting metals.

I claim as my invention:

1. In an electric arc cutting apparatus, the combination with electrodes of supporting bars for said electrodes, means to keep said bars apart, an adjustable means to limit the extreme distance between said electrodes, means to supply electric current to said electrodes, said bars being adapted to be held in a grip of an operator's hand, and being further adapted to be moved together by the pressure from said hand against said separating means, and means to direct a flow of oxygen between operating points of said electrodes.

2. In an electric arc cutting apparatus, the combination with electrodes, of supporting bars for said electrodes, said bars being made of an insulating material, a spring forming a loop and attached with its ends to the rear ends of said supporting bars, the other ends of said bars being adapted to support said electrodes in an inclined position with respect to each other, said bars being adapted to be held in a grip of an operator's hand, means to conduct electric current to said electrodes so as to produce electric arc between operating points of said electrodes, when said electrodes are brought together by the pressure from said operator's hand and separated again, and means to direct a flow of oxygen against said arc.

3. In an electric arc cutting apparatus, the combination with electrodes, of supporting means for said electrodes, means to conduct electric current to said electrodes, means to move said electrodes apart, means to adjustably limit said movement of the electrodes apart, said electrodes being adapted to be manually moved together, and means to direct the flow of oxygen against the tips of said electrodes.

Signed at New York, in the county of New York and State of New York, August, A. D. 1927.

VLADIMIR B. SOUNITZA.